Dec. 1, 1959 G. WENNERBERG 2,915,723

MAGNETIC AMPLIFIER

Original Filed June 19, 1951

INVENTOR.
GUNNAR WENNERBERG
BY
Leonard S. Knox
Attorney

United States Patent Office 2,915,723

Patented Dec. 1, 1959

2,915,723

MAGNETIC AMPLIFIER

Gunnar Wennerberg, Pacific Palisades, Calif., assignor to Lear, Incorporated

Continuation of application Serial No. 232,261, June 19, 1951, now Patent No. 2,790,948, dated April 30, 1957. This application March 5, 1957, Serial No. 644,166

5 Claims. (Cl. 336—155)

This invention relates to saturable core reactors and has particular reference to a magnetic amplifier for producing an alternating current output signal which is proportional in magnitude to a direct current control signal and an amplified version thereof. Sometimes such devices have been termed magnetic modulators.

This application is a continuation of application Serial Number 232,261, filed June 19, 1951, now Patent No. 2,790,948.

Saturable core reactors are well known, and have long been used as variable impedances for controlling the voltage or current in an alternating current circuit by means of direct current control voltages of relatively lower magnitude. One of the principal advantages of a device of this character is that it may thus be employed as a modulator, and one in which the signal circuit may be completely isolated from excitation and other circuits. While the use of a saturable core reactor as a modulator has been suggested, those devices known prior to this invention were not suitable for use where linearity, high speed of response, undistorted wave form, and absence of phase shift are required. In certain applications such as, for example, temperature control systems using thermocouples as the controlling element, and remote control systems where direct current control voltages of low potential must be translated with precise linearity into corresponding alternating current voltages for operating the controlled apparatus, the prior saturable core reactors fail to meet the exacting requirements imposed by the nature and character of the systems.

For the conversion of a direct current signal into an alternating current output electromechanical devices such as "choppers" may be employed, but for frequencies on the order of several hundred cycles per second, e.g. 400 cycles per second, as encountered aboard aircraft, the reliability, life and shock resistance of choppers leaves much to be desired. As an illustration it is noted that in connection with an instrument approach system for aircraft the direct current output of the radio receiver used aboard the craft must be converted into a corresponding alternating current signal of proper phase and magnitude for feeding to the discriminator and amplifier. Such translation becomes necessary for the reason that alternating current thermionic tube amplifiers are inherently far more stable than direct current amplifiers. Moreover when the direct current signal from the approach path is to be added to or substituted for other signals which are substantially alternating in character, such as might be derived from inductive pickoffs or potentiometers conversion to alternating current is more or less indispensable. The magnetic modulator of this invention is ideally adapted to an instrument approach system as aforesaid wherein the direct current signal input is of comparatively low magnitude. Assuming an input signal of 150 millivolts at 1000 ohms, and a suitable transformer to receive the output of the modulator a high impedance, 400 c.p.s. signal having a magnitude of several volts may be realized. However in the operation of the invention modulator the range of operation may be as low as 60 c.p.s. and higher than 400 c.p.s.

Furthermore, a chopper provides a signal which is independent of the driving voltage, whereas the magnetic modulator of the invention will provide a signal which is proportional to the excitation current. In this respect the modulator behaves in the same manner as ordinary pickoffs, e.g. those of the potentiometer and of the inductive types. This feature is of considerable value in applications wherein the reference signal is derived from such pickoffs. For example, the input signal to the pitch channel of the autopilot may be alternatively taken from the magnetic modulator and from a barometrically-actuated attitude sensing device which includes an inductive pickoff. In either case the two input signals are of similar character, and therefore affect the rest of the circuit in similar manner. Of even greater importance in the foregoing connection is the fact that the follow-up signal which cancels the signal originating at the output of the magnetic modulator and the gyroscope is inductive. The equilibrium point is then independent of the magnitude of the 400 c.p.s. line voltage.

When gain may be sacrificed, the performance of a magnetic modulator including such factors as linearity and speed of response, can be greatly improved, while at the same time simplifications of the modulator circuit itself can often be made. The demands on the magnetic core material also change. For instance, particularly high saturation flux density is not necessary, but the use of gapless cores does become even more imperative, thereby leading to the employment of core materials of the practically non-conductive ferrospinel type.

As noted in the R.C.A. Review, vol. XI, No. 3, September 1950, the term "ferrospinel" is a coined word used to denote a ferromagnetic spinel which is defined as a species of non-metallic cubic crystalline material containing iron in combined form. In U.S. Patent No. 2,452,529, in referring to such material by its former but misinformative, name, namely, "ferrite," it is suggested that the empirical formula may be written as $MFe_2O_4$, where M represents some bivalent metal ion such as iron, nickel, magnesium, etc., for example, zinc ferrite, $Fe_2ZnO_4$. Ferrospinels are preferred for the cores of the invention modulator since they may be pressed into cores of uniform density and dimensions and therefore substantially identical magnetic characteristics. In some ferro-spinels the permeability $\mu$ may reach 4500, and, being non-conductive, eddy current losses may be neglected. Additionally, the coercive force in some ferrospinels may be as low as 0.18 cerated.

Inasmuch as the two oppositely wound excitation windings employed in the invention modulator are to be as identical as practice will allow, the separate toroids on which each winding is carried are matched by a process of testing and selection, and as will be amplified upon hereinafter.

Another advantage arising out of the non-conductivity of the ferrospinels permits heavy loading of the modulator (short-circuit) with consequent linearizing effects. Moreover the windings may be applied directly on the core without an intermediate insulating layer, and with consequent reduction of bulk. Additionally ferrospinel cores are mechanically extremely stable, and therefore not as sensitive to the bending or stress as are laminated cores of iron or iron alloys which otherwise could result in variation and unbalance in the magnetic circuits.

In the employment of a magnetic modulator in an instrument approach system the main emphasis is laid upon linearity, non-critical operation as to variations in supply voltages, adaptability to existing components of the system, general simplicity, and smallest possible size and weight. Since the direct curent imput signal reverses in polarity depending upon the position of the airplane relative to the center line of the radio beam, the alternating voltage must reverse in phase, and there should preferably be no perceptible shift, or distortion of wave form. Accordingly the invention modulator is arranged in a system in such manner that operation is rendered effective over a small portion of the magnetization curve, in contrast to the high-excitation, Thyratron-like operation normally encountered in high-gain magnetic amplifiers.

It is therefore an object of this invention to provide a saturable core reactor device of the modulator type wherein a direct current signal potential is used to control the magnitude of an alternating current output potential, and which provides a substantially precise linear relation between the magnitudes of the control and output potentials.

It is also an object of this invention to provide a magntic modulator of the character set forth in the preceding paragraph wherein the phase of the output signal is constant and independent of the magnitude of the signal, but corresponds in direction to the polarity of the control signal.

It is another object of this invention to provide a magnetic modulator of the character set forth in the preceding paragraphs which utilizes a single winding as a direct current control winding and as an alternating current output signal winding.

It is also an object of this invention to provide a magnetic modulator of the character set forth in the preceding paragraphs wherein said annular cores are circumferentially continuous and made of a ferrospinel.

It is another object of this invention to provide a magnetic modulator device of the character set forth hereinbefore which includes a novel form of winding permitting the cores to be superimposed and brought more closely together than is possible with conventional forms of winding.

It is an additional object of this invention to provide a magnetic modulator which is small, light in weight, and so constructed and arranged as to make possible the manufacture of large quantities of devices having substantially identical performance.

Other objects and advantages of this invention will become apparent from a consideration of the following specification, read in connection with the accompanying drawings, wherein.

Figures 1, 2, 3, 4:
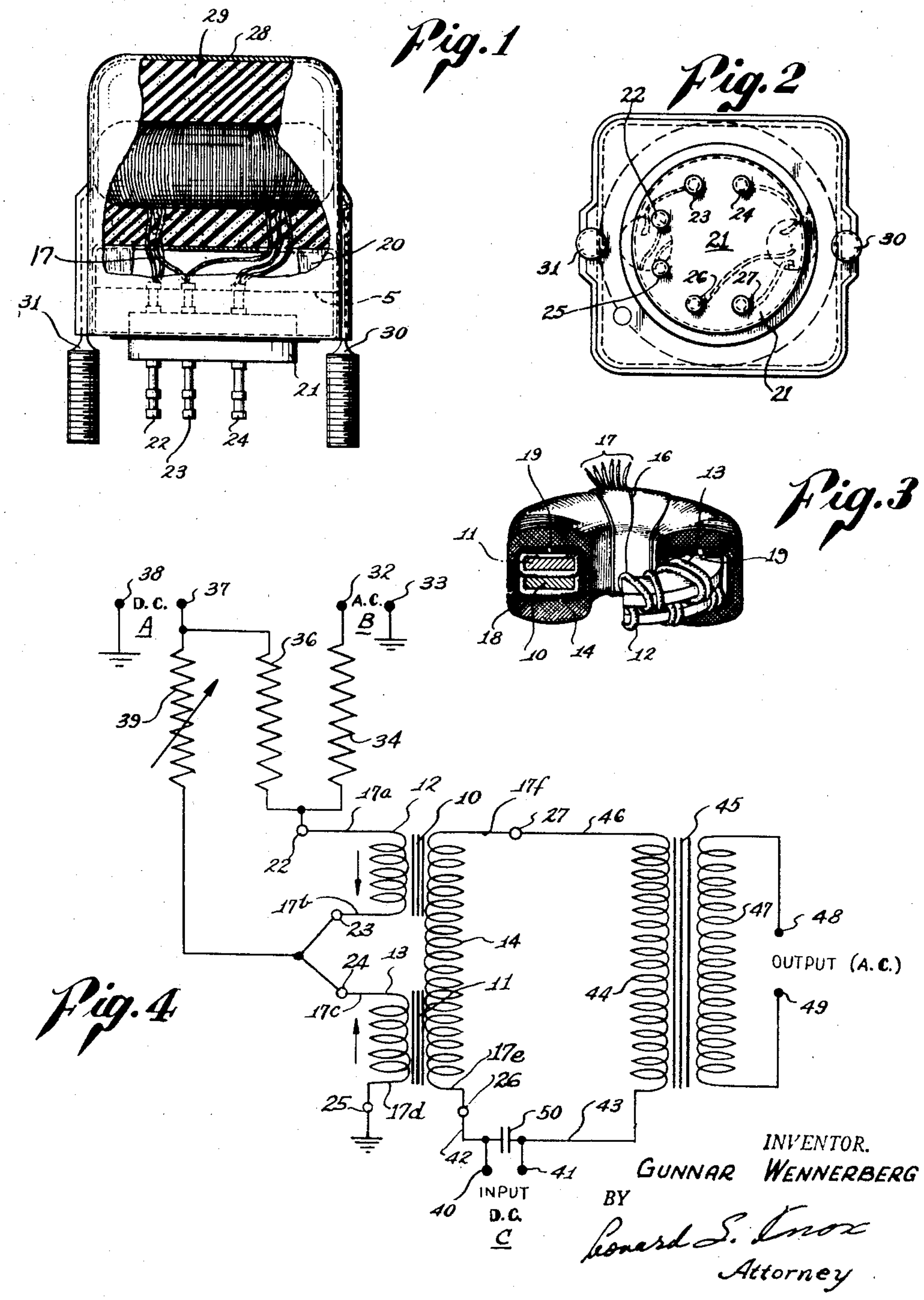
Fig. 1 is a side elevational view of a magnetic modulator constructed in accordance with this invention, parts of Fig. 1 being broken away and other parts being shown in section to illustrate the internal construction.
Fig. 2 is a bottom plan view of the structure shown in Fig. 1.
Fig. 3 is a fragmentary perspective view with parts shown in section illustrating the construction and arrangement of the electrical components of the modulator.
Fig. 4 is a wiring diagram illustrating the electrical connections employed in a preferred circuit arrangement using the modulator of this invention.

There has been chosen for illustration in the drawings a preferred form of magnetic modulator constructed in accordance with this invention and adapted particularly for use in radio remote control apparatus such as is sometimes incorporated in aircraft. In apparatus for these applications, it is necessary to control the operation of certain positioning apparatus such as is used to set and vary the positions of ailerons, rudders, or the like, the control being derived from the output of a radio receiver. For example, when employed in an instrument approach system of the type referred to hereinbefore the input to the modulator derived from the radio receiver is a low voltage direct curent signal. The magnitude and polarity of this signal are representatives of the desired position of a controlled element, is derived from a relatively low impedance circuit, and may have a maximum amplitude of no more than 150 millivolts. The polarity of the signal will reverse whenever the required position of the controlled mechanism is to be changed from one side of the null to the other side thereof, and accordingly the alternating current output of the modulator is required to reverse in phase for appropriate opposite movement of the aircraft control surfaces.

The magnetic modulator which is illustrated in the accompanying drawings is particularly adapted for use in such a remote control system, being so arranged as to operate on an input signal ranging in magnitude up to 150 millivolts and derived from a circuit having an impedance of approximately 1,000 ohms. The device produces an output signal having a magnitude which may be as high as six volts, and operates with the characteristics already briefly referred to at a frequency of 400 cycles per second, as is conventionally used on aircraft. The alternating current output signal is arranged to be delivered to a high impedance circuit, such as is associated with vacuum tube or gas discharge tube control apparatus for controlling the positioning mechanism. It is to be understood that reference to an operating frequency of 400 c.p.s. is not to be regarded as limitative, since, when ferrospinel cores are used, substantially higher frequencies should yield equal advantages.

As will be brought out more clearly hereinafter, the device is of rugged construction, is light in weight and small in size, making the device particularly adapted for use in miniaturized electronic apparatus, such as is frequently desired in aircraft installations.

As may be clearly seen by particular reference to Fig. 3, the invention modulator comprises a pair of continuous toroidal cores 10 and 11 which are superimposed in axial alignment with each other. The toroidal shape has been chosen because of the need for a gapless core, and for maximum overall compactness for a desired performance. As mentioned the invention unit is capable of being built to extremely small dimensions. In the example, each of the cores 10 and 11 have an inside diameter of 0.520″, an outside diameter of 0.900″, and a thickness of 0.095″, the radial cross section being rectangular with chamfered corners. Preferably the cores are formed by compressing the ferrospinel to the desired configuration in a mold, using material known commercially as Ferramic "G," obtained from General Ceramics and Steatite Corporation. The toroidal cores are furnished commercially with sharp corners which is undesirable insofar as winding of the turns is concerned. Accordingly, it is preferred to tumble the cores with a suitable abrasive to chamfer the edges. It has been found that efficient tumbling will reduce the magnetostrictive sensitivity, probably since the rounding or chamfering of the edges relieves stress maxima in those zones where the core is subjected to unsymmetrical squeezing effects.

In order that balance may be effected between the flux attributable to the windings carried on each of the cores 10 and 11, it is important that the cores be assembled in matched pairs. This may be accomplished in production by mounting, say 50 cores, with their respective excitation windings thereon on a straight copper rod constituting a common one-turn secondary. The differential voltage is measured when the cores are excited with the same bias, and somewhat greater A.C. current than that at which the windings are intended to be used, and the best pairs are selected. Around the core 10 there is wound a single layer input winding 12 and around the core 11 is wound a similar input winding 13, the windings 12 and 13 comprising a relatively small number of turns.

After the windings 12 and 13 are placed upon the cores 10 and 11, the same are superimposed in axial alignment with each other, as is shown in Fig. 3, and a control or signal winding 14 is then wound around the pair thereof. In the example, windings 12 and 13 each comprise 16 double or 32 single turns of No. 28 copper wire, and the signal winding comprises 5000 turns of No.

42 copper wire, the latter representing a resistance of approximately 600 ohms. Tape 16 is applied to the outside of the winding 14 in the usual manner to protect the outer winding and to anchor the connecting leads 17 to the various windings.

In order that the cores 10 and 11, when superimposed, may lie as closely together as possible to maintain the signal winding turns at minimum length, the windings 12 and 13 are so arranged that the turns extending radially over the underside of the core 11 may be received in spaces intermediate windings extending radially over the upper side of the core 10 and vice versa. This is preferably accomplished by arranging the turns in pairs, the pairs being circumferentially spaced from each other as may be seen in Fig. 3. Thus the cores 10 and 11 need be separated only by a distance corresponding to the thickness of a single conductor. The foregoing construction may be realized by employing a suitable winding guide or button having grooves to facilitate the spacing of the turns as winding proceeds.

If desired, an electrostatic shield 18 may be interposed between the superimposed cores 10, 11 with their associated windings 12, 13 and the outer winding 14. To avoid electromagnetic effects due to the shield acting as a short-circuited turn, a circumferential gap 19 may be provided.

While the assembled electrical components of the magnetic modulator shown in Fig. 3 may be incorporated into various forms of apparatus and mounted as desired, a preference is expressed for the mounting and terminal structure which is illustrated in Figs. 1 and 2 of the drawings.

As may be seen in Fig. 1, use is made of a two-part substructure 20, the lower part being made of any suitable metal such as cold rolled steel, and the upper part of annealed highly permeable magnetic material to serve as a magnetic shield. The parts comprise what may be termed a pill-box and are abutted at the line 5. Within a suitable aperture provided in the bottom of the lower part there is mounted a terminal block 21 formed of insulating material, and carrying an appropriate number of electrical terminals 22, 23, 24, 25, 26 and 27, these terminals including exposed portions below the insulating block 21 to which external electrical connections may be soldered, and including exposed internal portions to which the leads 17 (Fig. 2) from the modulator windings are soldered. The leads 17 pass upwardly from the terminals 22—27 through a pair of apertures formed in the upper part of the sub-structure 20. The assembled windings, as shown in Fig. 3, are placed above the sub-structure 20. A shield or cover 28 also of annealed, highly permeable magnetic material, is provided, and is so dimensioned as to receive the lower part of the sub-structure 20 snugly, whereafter union is effected by solder applied to the lower adjacent margins thereof. Following the foregoing step there is poured in through a hole near the top of the cover 28 a suitable quantity of potting compound 29, which, when solidified by baking, serves to protect the windings against shock, and to furnish electrical insulation therearound. For the foregoing purpose it is preferred to employ a polymerizing type of plastic material capable of being initially handled as a liquid, and which, after polymerization, takes on a rubber-like consistency, e.g. Compound No. 1778 available from Westinghouse Electrical and Manufacturing Co. A cushion of this character not only eliminates physical damage due to vibration, but also the deleterious effect of magnetostriction arising from mechanical stress caused by temperature changes during operation. That is to say, certain other commonly used potting compounds, such as wax, are softened easily by heat, and when the same rehardened it was found that the shrinkage was such as to place strain on the winding assembly, with consequent shifting of the null point and necessary readjustment thereof.

The enclosure 28 may be provided with a pair of spade bolts 30 and 31 suitably secured to the sides thereof for receiving nuts to secure the assembled device to a base, chassis, panel, or the like.

The electrical connections and one preferred manner of use of the magnetic modulator of this invention are illustrated in Fig. 4.

For convenience the group of leads 17 (Fig. 3) will be referred to as follows: **17*a* to terminal 22, 17*b* to terminal 23, 17*c* to terminal 24, 17*d* to terminal 25, 17*e* to terminal 26 and 17*f* to terminal 27. In the example shown terminals 23 and 24 are connected in common through a potentiometer 39 to a terminal 37, which latter together with a terminal 38 represent a source of direct current bias, hereinafter referred to as voltage A. Terminal 38 is grounded, as is terminal 25. Terminal 22 is connected commonly to resistances 34 and 36, which latter may comprise a string of tube filaments or heaters, as will be understood. The other end of resistance 36 is connected to terminal 37, while the other end of resistance 34 is connected to one terminal 32 of an A.C. excitation source B, the other one 33** of which is grounded.

The terminal 27 of winding 14 is connected by a lead 46 to the primary 44 of a coupling or output transformer 45, and the terminal 26 by means of a lead 42 to a terminal 40 of the source of direct current signal input voltage C. Terminal 41 of this latter is connected by a conductor 43 to the other end of the primary 44. In the event the circuit to which terminals 40 and 41 is connected presents a relatively high impedance to alternating current a by-pass condenser 50 may be bridged across the terminals 40 and 41. Secondary 47 of transformer 45 is connected to terminals 48 and 49, representing the alternating current output voltage of the modulator, wherefrom the same may be fed to the grid circuit of a thermionic amplifier, discriminator or other device. From the preceding it is to be noted that there is no galvanic connection between the excitation circuit and the signal circuit.

Operation is as follows: The two cores 10 and 11 are excited by the same alternating current voltage B flowing through the windings 12 and 13 which are arranged series opposing so that no net voltage is induced in the signal winding 14. This symmetrical condition will be maintained even though a direct current voltage component is added to the alternating current excitation, as the two cores will, at every moment, still be subject to a magnetizing force of equal strength but opposite sign.

Whenever a direct current potential C, or signal voltage, derived from a controlling source, is applied to the points 40 and 41, a direct current is caused to flow in the winding 14. This winding, because it encircles both of the cores 10 and 11, is wound in the same direction with respect to each of these cores. The current flowing in the winding 14 thus aids current flow in one of the excitation windings and opposes that in the other in the production of the direct current biasing magnetic flux in the cores 10 and 11, thus disturbing the no-signal-voltage symmetry and shifting the alternating current excitation point on the magnetization curves for the cores 10 and 11 in opposite directions.

This net differential flux will induce a corresponding alternating voltage in the winding 14, causing an alternating current to flow through the primary winding 44 of the transformer 45 and producing a corresponding output voltage on the terminals 48 and 49. Since the magnitude of this output voltage is proportional to the net differential flux between the cores 10 and 11, it will be seen that so long as the two cores are operated over regions of their excitation curves where the curvatures at their respective working points are different, an output voltage will be produced and such voltage will be substantially linearly proportional in magnitude to the magnitude of the direct current control voltage applied to the terminals 40 and 41. The linearity is the result of the fact that the displacement of the working point due to a signal is small, while the rate of change of curvature over the displacement range is substantially constant.

Linearity is greatly improved by loading the output circuit. Since ferrite cores have a relatively large coercive force the excitation current must exceed a predetermined minimum value in order to overcome this force. In this case the modulator operates with no hysteresis in its transfer function. To obtain a substantially undistorted output voltage, it is necessary to load the output circuit very heavily so that the operation approaches a short-circuit condition. Under these conditions, the device operates in a manner analogous to a current transformer in that the output current is proportional to the excitation current rather than being proportional to the excitation voltage. However, since the excitation current is constant, the proporitonality factor is caused to vary linearly with the variation in the magnitude of the input signal current so that the output signal bears a linear relation to the magnitude of the direct current input signal.

If the excitation current is pure A.C., the voltage induced in the windings 14 will consist of even harmonics of the excitation frequency. If a D.C. bias is added the induced voltage will consist mainly of the fundamental frequency. The effect of varying the D.C. bias A will be more particularly described hereinafter. Such bias is preselected by means of the resistor 36, while the rheostat 39 is employed to provide an infinitesimal correction current. Rheostat 39 is of a higher order of magnitude than resistor 36. In the example a normal D.C. bias of approximately 300 milliamperes was obtained by applying at A a potential of 28 volts and fixing the resistance 36 at about 90 ohms. An A.C. excitation B on the order of 200 milliamperes is obtained by connecting terminals 32 and 33 to a 400 c.p.s. source of 1 volt potential, with the resistance 34 of a value of 3 ohms, the remaining 2 ohms impedance being that of the windings 12 and 13. However, the D.C. resistance of these windings is much lower than 2 ohms, and therefore no appreciable part of the D.C. bias current may flow back through the resistance 34, and thence through the source B to ground. A device connected as aforesaid and having the construction hereinbefore exemplificatively set forth provided an output voltage at 48 and 49 varying from zero to 4 volts R.M.S., as the D.C. signal voltage was varied from zero to 150 millivolts.

The output wave shape is practically sinusoidal, but is dependent to some extent on the type of coupling transformer employed. The phase of the output voltage is constant, and nearly in phase or 180° out of phase with the input signal depending upon the polarity of the signal. Exact phasing can easily be accomplished by adding some tuning capacity across the coupling transformer.

Any A.C. components present in the input will be transformed over to the output. It is necessary, therefore, to provide a filtered D.C. signal, but since the filter may assume any well-known suitable form further details thereof are deemed superfluous.

In the exemplificative modulator no noticeable delay in response can be observed by observation of a cathode-ray oscilloscope.

The modulator is relatively independent of variations in supply voltages. As is the case with inductive pickoffs, the modulator output is proportional to the A.C. excitation current, and also varies with the value of D.C. bias current, but to a lesser degree than in direct proportion to the excitation current. In cases where non-sinusoidal output wave shape may be tolerated, a substantial increase in output and gain may be obtained by raising the value of A.C. excitation. Good sensitivity may be realized with no D.C. bias, and in this instance the output will consist solely of even harmonics of the excitation frequency.

The small amount of residual voltage present at zero signal, consisting principally of high harmonics of the supply voltage, is sufficiently low not to cause difficulty in the functioning of usual forms of discriminator circuits. The unit is characterized by no detectable random noise effects.

Balance of the modulator is practically unaffected by temperature changes between −50° C. and 125° C., and the current sensitivity increases about 30% when the temperature changes from −50° C. to 50° C. As the resistance of the copper increases about 40% over the same range, a temperature coefficient of zero may be obtained by proper matching to the signal source impedance.

Thus the differential flux is expressed as $$AB_{10}-AB_{11}=0$$

It is of interest to observe that the action of a short circuited magnetic modulator is, in some respects, very similar to that of a current transformer. That is to say $I_0=kI_E$ where $I_0$ is the output current, $I_E$ is the excitation current and $k<1$. The output ampere-turns are not necessarily equal to the signal ampere-turns, as is the case in a normal, highly saturated reactor without feed-back. In practice it has been possible to operate the invention modulator so as to obtain a linear relationship between the signal and output currents that is at least as good as the reading accuracy of ordinary meters.

Where best possible sensitivity is required, demands on linearity are not too great, and where frequency doubling from excitation to output can be tolerated unbiased operation is advantageous. In connection with the unbiased case it will be apparent that when the excitation consists only of alternating current, the output signal will consist of even harmonics of the excitation frequency.

It will be noted that since a deliberate unbalance can be produced by adjustment of the potentiometer 39 a zero output signal may be achieved at some fixed and finite value of direct current control voltage. Since the phase of the output signal reverses as the balance point is passed, this arrangement may be used to cause operation of a controlled device whenever the direct current control voltage passes a predetermined critical value. Such an arrangement is of particular utility when the device is employed in such systems as temperature control systems. In such a system the operating or controlled temperature may be determined by so selecting the resistance 36 and adjusting the potentiometer 39 as to balance the modulator at a direct current control voltage corresponding to the desired temperature, and by using a phase-responsive controlled device.

It is within the scope of the invention to connect the windings 12 and 13 in parallel, if they are arranged to be fed through separate resistors. Moreover, the excitation windings and the signal winding may be interchanged within the scope of the invention.

Attention is directed to the connection of the windings 12 and 13 in series in preference to a parallel connection. While the windings 12 and 13 may be connected in parallel if desired, certain advantages are obtained by the series connection, as then the alternating excitation current and the direct bias current through both windings will be identical. The foregoing is dependent, of course, on the presence of identical cores and identical windings thereon, a result which can be reached almost ideally by proper care in manufacture.

Occasionally, because of minor departures from the idealized construction, it will be found that the alternating fluxes induced in the cores 10 and 11 do not exactly balance each other, so that a signal is induced in the winding 14. This unbalanced condition may be corrected by adjusting the potentiometer 39 to provide a different magnitude of direct current bias in the winding 13 than that which is caused to flow in the winding 12. Potentiometer 39 is consequently made of a larger order of magnitude than resistance 36, so that adjustment of the potentiometer is effective to vary the D.C. current without appreciably varying the effective value of the A.C. component in the excitation windings.

From the foregoing it will be seen that this invention provides a magnetic modulator having the desirable properties of producing an alternating output voltage, the magnitude of which bears a linear relation to the magnitude of a direct current control potential. Furthermore, the device is so constructed and arranged that the phase of the output signal remains constant and is independent of the magnitude of the applied control voltage, but is nevertheless representative of the polarity of the control voltage in that when the polarity of the control voltage is reversed, the phase of the output signal is shifted 180°. The device produces a substantially undistorted sinusoidal output voltage, and provides an output of substantial magnitude in response to control voltages in the millivolt range.

Attention is directed particularly to the fact that the device described herein employs a single winding serving the dual purpose of an alternating current output winding and a direct current input control winding. In a similar way it will be noted that a single set of windings is used for both alternating current excitation and direct current bias.

The advantages of the invention modulator and systems may be summarized as follows:

(1) Core matching is simplified by reduction of the number of saturable cores to a minimum; in this case, two.

(2) Dependence of balance upon the resistance values of the windings is avoided by transferring the energy from the excitation source purely through flux linkages, and the connecting of all excitation windings in series.

(3) Achievement of the largest possible number of control ampere-turns results from using the greatest possible portion of the winding space for the control winding; in this case by superimposing the excitation windings in a closely stacked arrangement and winding the control turns therearound.

(4) For a sinusoidal output current excitation of the modulator with a constant A.C. current, rather than by a given voltage.

While I have shown a particular embodiment of my invention, it will be understood, of course, that I do not wish to be limited thereto since many modifications may be made, and I therefore contemplate by the appended claims to cover any such modifications as fall within the true spirit and scope of my invention.

Having thus described my invention, what I claim and desire to secure by Letters Patent is:

1. In a magnetic amplifier, a plurality of spaced-apart, coaxial magnetic cores of annular form each having a single-layer, toroidal winding thereon, the portions of said windings traversing the confronting faces of the cores being disposed substantially radially of the cores and each comprising groups of conductors in side-by-side relation, each group being spaced circumferentially from adjacent groups, the substantially sectorial spaces therebetween being wider than the groups, said cores and the windings thereon being superimposed with the groups of conductors of each endmost winding being received on one side in the spaces between adjacent groups of the adjacent windings and the groups of conductors of the windings intermediate the endmost windings being received on both sides in the spaces between adjacent groups of the adjacent windings whereby the confronting faces of said cores are spaced apart axially a distance no greater than the diameter of one of said conductors.

2. In a magnetic amplifier, the combination of: a pair of superimposed annular magnetic cores; a winding for each of said cores; a winding encircling both of said cores; and an electrostatic shield interposed between said encircling winding and said other windings, said shield comprising an annular tube defining an annular interior space within which said superimposed cores and windings are accommodated, said tube having a circumferentially extending slot formed therein and communicating with said space.

3. In a magnetic amplifier, a pair of magnetic cores of annular form each having a single-layer toroidal winding thereon, said cores being superimposed in axial alignment, the confronting faces of said cores being defined by radial planes normal to the aligned axes of said cores, the portions of said windings traversing said faces being disposed radially of said cores and each comprising groups of conductors in side-by-side relation, each group being spaced circumferentially from adjacent groups, substantially sectorial spaces therebetween being wider than the groups, said cores and the windings thereon being superimposed with the groups of conductors of one of said windings received in the spaces between adjacent groups of the other windings, whereby said faces of said cores are spaced apart axially a distance no greater than the diameter of one of said conductors.

4. In a magnetic amplifier, a pair of magnetic cores of annular form each having at least one, flat, radially disposed face and a single-layer, toroidal winding thereon, said cores being positioned in axial alignment and with their respective flat faces confronting, the portions of said windings traversing said faces being disposed substantially radially of said cores and each comprising groups of conductors in side-by-side relation, each group being spaced circumferentially from adjacent groups, the substantially sectorial spaces therebetween being wider than the groups, said cores and the windings thereon being superimposed with the groups of conductors of one of said windings received in the spaces between adjacent groups of the other windings, whereby said faces of said cores are spaced apart axially a distance no greater than the diameter of one of said conductors.

5. In a magnetic amplifier, at least two coaxial annular ferrite cores, a toroidal winding on each of said cores, portions of the respective windings on the confronting surfaces of said cores being circumferentially spaced, and said portions on each winding being interposed between adjacent portions of the other winding, whereby the confronting faces of said cores are axially spaced a distance no greater than the diameter of one of said conductors.

References Cited in the file of this patent

UNITED STATES PATENTS

| | | |
|---|---|---|
| 1,320,980 | Bowman | Nov. 4, 1919 |
| 2,735,989 | Williams | Feb. 21, 1956 |